Jan. 27, 1942. M. P. VENEMA 2,270,913
CONTROLLING TEMPERATURES IN SIMULTANEOUSLY CONDUCTED
ENDOTHERMIC AND EXOTHERMIC REACTIONS
Filed Nov. 4, 1939
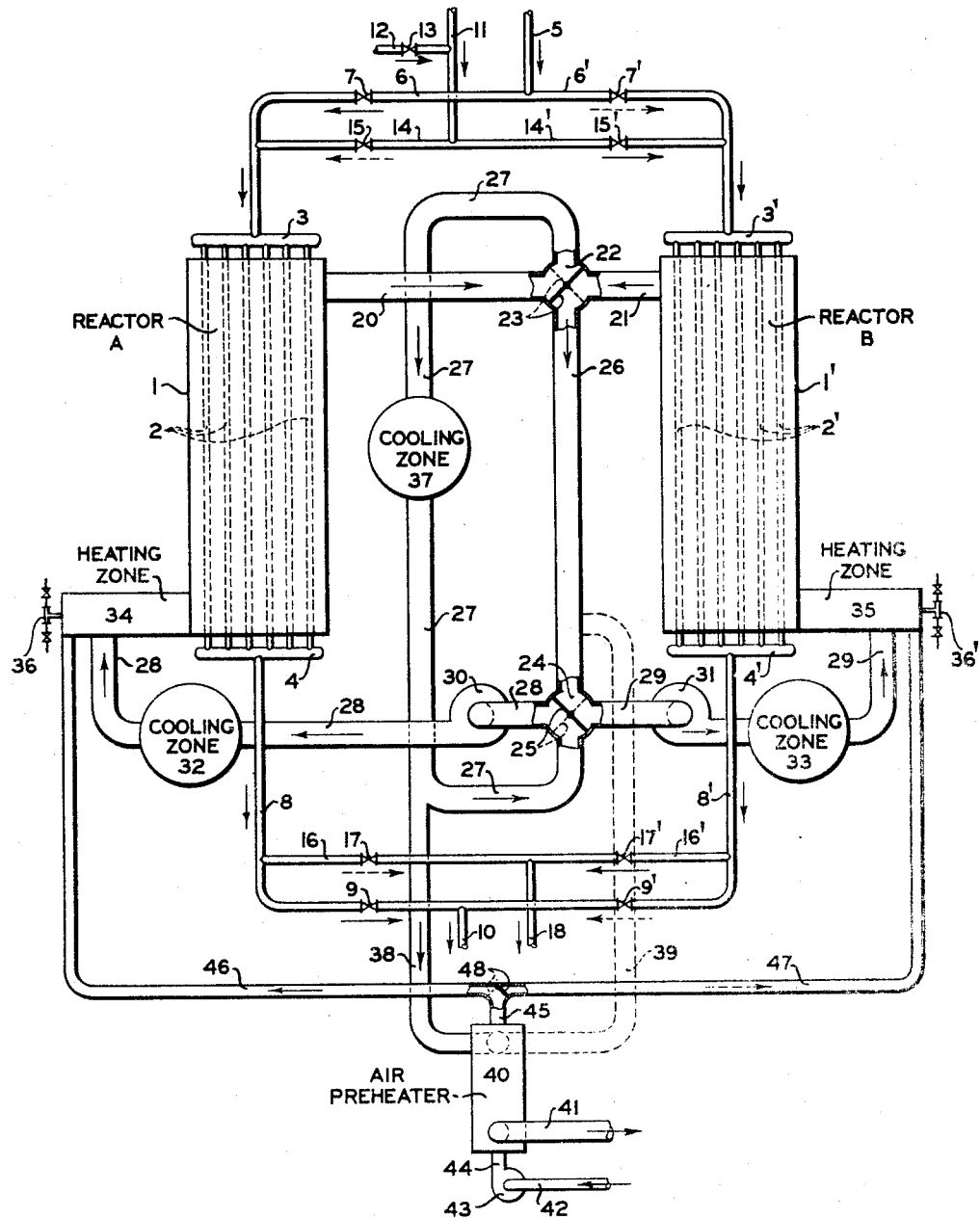
INVENTOR
MAYNARD P. VENEMA
BY
ATTORNEY

UNITED STATES PATENT OFFICE 2,270,913

CONTROLLING TEMPERATURES IN SIMULTANEOUSLY CONDUCTED ENDOTHERMIC AND EXOTHERMIC REACTIONS

Maynard P. Venema, Chicago, Ill., assignor to Universal Oil Products Company, Chicago, Ill., a corporation of Delaware Application November 4, 1939, Serial No. 302,847

2 Claims. (Cl. 23—288)

The invention relates to an improved method and means of controlling the temperatures of endothermic and exothermic conversion reactions simultaneously conducted in separate reactors, each of which is alternately employed as the zone of endothermic reaction and as the zone of exothermic reaction and wherein the two reactions are conducted at different temperature levels.

To maintain the desired reaction temperature in each reactor, a separate cyclic stream of convective fluid is circulated through each reactor in indirect heat transfer relation with the reactants undergoing conversion therein and alternately operated heating and cooling means are provided in each stream, exterior to the reactors, whereby heat is supplied to the stream serving to control the temperature of the endothermic reaction and heat is abstracted from the stream serving to control the temperature of the exothermic reaction.

Except in rare cases, the temperature of the stream of convective fluid serving each reactor will be changed considerably when the reactor is shifted from endothermic to exothermic operation or from exothermic to endothermic operation and, as a result, the motivating means, such as pumps, compressors or blowers provided in the separate streams, must, in conventional practice, operate at temperature levels which vary considerably from time to time during operation.

These temperature changes are abrupt and subject the propulsion means to considerable strain and fatigue. In addition, unless the speed of the propulsion means is changed to compensate for changes in temperature, their discharge capacity will vary resulting in a corresponding upset in the smooth operation of the system. To obviate this difficulty and permit operation of the propulsion means under substantially constant conditions of temperature, speed and discharge capacity, I provide an auxiliary cooler and continually pass the highest temperature stream of convective fluid through this zone and cool it to approximately the temperature of the other stream. The flow through this auxiliary cooler is controlled by suitable switching dampers or the like which are reversed when zones of endothermic and exothermic reaction are shifted with respect to the reactors. This arrangement, in addition to obviating the difficulties above mentioned, causes the propulsion means to operate at a substantially lower temperature than the maximum at which they would be otherwise required to function.

The features of the invention are advantageously applicable to the control of any simultaneously conducted endothermic and exothermic reactions so long as different temperatures are required for the temperature control medium (convective fluid) in the separate reactors. The feature of substantially equalizing the temperature of the separate streams of convective fluid supplied to the propulsion means in the circuit serving each reactor is advantageous regardless of the specific convective fluid utilized and regardless of the specific form of propulsion means employed. The convective fluid may be either liquid, vaporous or gaseous or may exist in different phases at different points in the system and the invention specifically contemplates the use of combustion gases, molten metals or metallic alloys, molten salts or eutectic or non-eutectic salt mixtures.

The accompanying drawing is essentially a flow diagram illustrating one specific form of system incorporating the features of the invention. In the system illustrated, combustion gases are employed as the convective medium. The endothermic reaction in the system illustrated comprises conversion of a stream of hydrocarbons in the presence of a mass of contact material, such as catalyst capable of promoting the reaction, and the endothermic reaction comprises burning from the contact mass, heavy carbonaceous materials deposited thereon during the hydrocarbon conversion reaction.

Referring to the drawing, two substantially identical reactors A and B are provided, and comprise outer shells 1 and 1', respectively, through which the respective tubular elements 2 and 2' extend. The tubular elements 2 of reactor A terminate at their upper ends in a manifold or header 3 and at their lower ends in a similar manifold or header 4. Similarly, the tubular elements 2' of reactor B terminate at their upper ends in a manifold or header 3' and at their lower ends in a similar manifold or header 4'. Each of the tubular elements contains a bed of contact material or catalyst, not illustrated which, in active state, is capable of promoting the endothermic conversion reaction, the fouled catalyst in one reactor being reactivated for further use while fresh or reactivated catalyst in the other reactor is contacted with the hydrocarbons and promotes their conversion.

Temperature conditions suitable for the endothermic conversion reaction are maintained within the tubular elements in which this reaction is taking place by circulating a convective medium through the shell of the reactor about the tubular elements at a somewhat higher temperature. The temperature of the exothermic reaction is similarly controlled to prevent damage to the catalyst by circulating a convective medium through the shell of the reactor about the tubular elements wherein reactivation of the catalyst is taking place and the temperature of the convective fluid in this reactor is maintained at a level considerably below that at which permanent impairment to the activity of the catalyst will occur.

The stream of hydrocarbon reactants to be converted is supplied to the system at a temperature at which the desired conversion reaction will be initiated upon contact of the hydrocarbons with the catalyst. The heated hydrocarbons enter the system through line 5 and, while reactor A is employed as the zone of endothermic reaction, they are supplied to the tubular elements of this reactor through line 6, valve 7 and header 3. While reactor B is employed as the zone of endothermic reaction the heated hydrocarbons are supplied to the tubular elements 2' of this reactor through line 6', valve 7' and header 3'. The desired conversion reaction takes place within the tubular elements of the reactor wherein the hydrocarbon reactants contact the active catalytic material, resulting conversion products being discharged from the tubes of reactor A, while the endothermic reaction is taking place in this zone, through header 4, line 8, valve 9 and line 10 and, while the endothermic reaction is taking place in reactor B, the resulting conversion products are discharged from the tubular elements in this reactor through header 4', line 8', valve 9' and line 10. Line 10 leads to suitable separating and recovery equipment of conventional form which is not pertinent to the present invention and is therefore not illustrated.

While one of the reactors is being employed as a zone for conducting the hydrocarbon conversion reaction, deleterious heavy carbonaceous material, which has been deposited on the catalyst in the other reactor during its previous period of use as the zone of endothermic reaction, is burned therefrom in a stream of oxygen-containing gases.

Ordinarily, the quantity of carbonaceous material deposited on the catalyst and the nature of the catalytic material will not permit the use of oxygen or air alone as the reactivating gas and, to assist in preventing the development of excessive temperatures in the catalytic mass, the reactivating gas employed is a relatively dilute mixture of air or oxygen and non-oxidizing gas or gases such as carbon dioxide, nitrogen or the like. Combustion gases generated without excess air or substantially freed of combined oxygen subsequent to their generation are particularly suitable as the non-oxidizing ingredient of the reactivating gas stream due to their ready availability and low cost.

In the case here illustrated, combustion gases substantially free of uncombined oxygen are supplied to the system through line 11 and regulated minor amounts of air are supplied to line 11 through line 12 and valve 13, the resulting mixture being directed through line 14, valve 15 and header 3 to the tubular elements of reactor A, when the latter is employed as the zone of exothermic reaction, and through line 14', valve 15' and header 3' to the tubular elements of reactor B when this reactor is employed as the zone of exothermic reaction.

The temperature of the reactivating gas stream entering the tubular elements of the reactors is maintained at a sufficiently high level to initiate combustion of the carbonaceous material on the catalyst upon contact of the oxygen-containing gases therewith. This may be accomplished by heating the mixture or the non-oxidizing ingredients thereof in any well known manner which is not a novel part of the invention and is therefore not illustrated.

The spent or partially spent reactivating gases and combustion products, formed by burning of the carbonaceous materials from the catalyst, are directed from reactor A, while the latter is employed as the zone of exothermic reaction, through header 4, line 8, line 16, valve 17 and line 18 and, while reactor B is employed as the zone of exothermic reaction, these materials are directed through header 4', line 8', line 16', valve 17' and line 18. The gases from the reactor in which the exothermic reaction is taking place may be discharged from the system through line 18 or the latter may lead to suitable equipment of any well known form, not illustrated, for recycling the gases to line 11 after freeing the same of deleterious materials and readjusting their temperature, quantity and oxygen content to the desired value.

An outlet duct 20 from shell 1 of reactor A and an outlet duct 21 from shell 1' of reactor B each communicate with a switching zone 22 containing a stream-directing member such as reversible damper 23, the position of which determines the path of flow of each of the streams of convective fluid (combustion gases in this instance) discharged from the reactors. A similar switching zone 24, containing a similar stream-directing member such as reversible damper 25, communicates with zone 22 through separate ducts 26 and 27, through one of which combustion gases discharged from reactor A are directed to zone 24, while combustion gases discharged from reactor B are directed through the other duct to zone 24 and vice versa, depending upon the position of damper 23. Zone 24 also communicates with the inlet side of the shell of reactor A through duct 28 and with the inlet side of the shell of reactor B through duct 29 and the relative position of dampers 23 and 25, at any given time during the operation of the system, is such that combustion gases discharged from reactor A are returned thereto and combustion gases discharged from reactor B are returned thereto through the switching zones and communicating ducts.

A propulsion device, such as a fan, blower or compressor indicated at 30, is provided in duct 28 for effecting positive and relatively rapid circulation of the combustion gases through the cycle serving reactor A and a similar propulsion device 31 is provided in duct 29 for effecting positive and relatively rapid circulation of the combustion gases in the cycle serving reactor B. The combustion gases of the circuit serving reactor A flow through a cooling zone 32 provided in duct 28 after leaving member 30 and thence through a heating zone 34 prior to their introduction into the space surrounding the tubes in reactor A. A corresponding cooling zone 33 and a corresponding heating zone 35 are provided at corresponding points in the combustion gas circuit serving reactor B.

Cooling zones 32 and 33 are alternately operated and may employ any desired conventional cooling means such as, for example, a heat exchanger capable of reducing the temperature of the combustion gas stream serving the reactor wherein the exothermic reaction is taking place to the desired value. The heat thus recovered from the combustion gases may be utilized, for example, to generate steam by employing water as the cooling fluid in zones 32 and 33 or to preheat air utilized for the combustion of fuel in generating the combustion gases employed as the convective medium and/or the combustion gases employed as the inert components of the reactivating gas stream, or to heat the hydrocarbon reactants or the reactivating gases or to heat other reactants for a concomitantly operated process.

Heating zones 34 and 35 may also be of any desired form and, in the particular case here illustrated, they comprise combustion and mixing zones wherein fresh increments of hot combustion gases are generated and commingled with the cooler gases of the circuit serving the reactor wherein the endothermic reaction is taking place. Burners 36 and 36' supply combustible fuel and air for atomization thereof to the respective combustion zones 34 and 35 and, in the particular case here illustrated, additional air may be supplied to these zones, as will be later described. Heating zones 34 and 35, like cooling zones 32 and 33, are alternately operated.

The positions of dampers 23 and 25 are so adjusted that the combustion gas stream which is supplied to zone 22 at the highest temperature flows continuously through duct 27, while the lower temperature gas stream supplied to this zone flows continuously through duct 26 and the temperature of the relatively hot gases passing through duct 27 is reduced in cooling zone 37 to substantially the same value as the lower temperature gas stream passing through duct 26. Cooling zone 37, disposed in duct 27, is operated continuously and, like zones 32 and 33, may be of any desired conventional form employing any suitable cooling medium.

Assuming that, as will usually be the case, the combustion gases in the circuit serving the reactor in which the endothermic reaction is taking place are maintained at a higher temperature level than the combustion gases in the circuit serving the reactor in which the exothermic reaction is taking place; the stream to which fresh increments of hot combustion gases are added in heating zone 34 or in heating zone 35, as the case may be, will be the hotter stream of gases which is passed through duct 27 and cooling zone 37. Therefore, to compensate for the quantity of hot combustion gases added to the cycle in the heating zone, a corresponding quantity of the cooled gases discharged from zone 37 through duct 27 is removed from the latter and supplied through duct 38 to air preheater 40 wherein the gases are further cooled by indirect heat exchange with air to be subsequently utilized, as will be later explained, for supporting combustion in heating zone 34 or in heating zone 35, depending upon which of these zones is in operation. Thus, the quantity of combustion gases in this circuit is maintained substantially uniform throughout the operation despite the continuous addition of fresh increments of hot combustion gases thereto in the heating zone.

In case the conditions with respect to relative temperatures in the two cycles is the reverse of that above described, (i. e., the combustion gases in the circuit serving the reactor in which the endothermic reaction is taking place are maintained at a lower temperature level than the combustion gases in the circuit serving the reactor in which the exothermic reaction is taking place) the quantity of combustion gases will tend to build up in the circuit of which duct 26 is a part and a quantity of combustion gases regulated to compensate for the quantity of hot combustion gases added to this cycle in the heating zone, is directed from duct 26 through duct 39, which is indicated by dotted lines in the drawing, to air preheater 40 to keep the quantity of combustion gases in this circuit substantially constant.

Since the excess gases discharged from the circuit to which the hot combustion gases are added in the heating zone in operation will ordinarily contain a considerable quantity of readily available heat, a substantial portion of this heat is recovered for some useful purpose such as, for example, preheating air to be utilized for supporting combustion in heating zones 34 and 35. This, however, is not in itself a novel or essential part of the process and, when desired, these excess gases may be discharged from the system by any well known means, not illustrated, without recovering heat therefrom, or available heat may be recovered therefrom in any other manner than that illustrated.

When air preheater 40 is utilized in the manner previously indicated, the combustion gases supplied to this zone are discharged therefrom, after they have given up a portion of their heat, through duct or flue 41 to a suitable stack or the like, not illustrated. Atmospheric air is supplied to a suitable blower or compressor 43 through duct 42 and is delivered from blower or compressor 42 through duct 44 to air preheater 40, wherethrough it passes in indirect heat transfer relation with the combustion gases supplied to this zone. The resulting preheated air is directed from zone 40 through duct 45 and thence either through duct 46 to heating zone 34 or through duct 47 to heating zone 35. A hinged damper or other movable stream-directing member 48 of any desired form, located at the junction of ducts 45, 46 and 47, selectively directs the preheated air to the heating zone in operation.

As an example of one specific operation of the process employing a system such as illustrated in the drawing for the catalytic conversion of hydrocarbon oil with periodic reactivation of the catalyst in situ, we will assume for the moment that catalytic cracking is taking place in reactor A and that the previously used catalyst in reactor B is being reactivated. The oil to be cracked is introduced in heated essentially vaporous state into contact with the active catalyst disposed in tubes 2 of reactor A through lines 5 and 6, valve 7 and header 3 at a temperature of approximately 930° F.

The catalyst employed in this particular instance comprises granular particles of substantially uniform size and shape formed from a synthetically prepared mixture consisting essentially of silica, alumina and zirconia, in the proportion of approximately 100 mols of silica to 10 mols of alumina to 5 mols of zirconia.

With the particular type of oil undergoing treatment and under the specific conditions of pressure and volume of catalyst employed per unit volume of oil undergoing cracking in a given time, an average temperature of approximately 950° F. is desired in the zone of the catalytic cracking reaction and, to maintain this temperature, the combustion gases in the circuit serving reactor A enter the reactor at approximately 1550° F. and are circulated about the tubes at such a rate that they leave the reactor at a temperature of approximately 1225° F.

The products of the catalytic cracking reaction are directed from the tubular elements 2 of reactor A through header 4, line 8, valve 9 and line 10 to suitable separating and recovery equipment.

While the catalytic cracking reaction is taking place in reactor A, air is supplied through line 12 and valve 13 to line 11 wherein it commingles with a stream of hot combustion gases and the resulting mixture, which contains approximately 3% of air, is directed from line 11 through line 14', valve 15' and header 3' into contact with the catalyst to be reactivated in tubes 2' of reactor B, at a temperature of approximately 1000° F. In this particular instance the temperature of the catalyst employed should not exceed approximately 1300° F. and, to maintain conditions in reactor B which will prevent excessive heating of the catalyst, the combustion gases in the cycle serving this reactor are supplied thereto at a temperature of approximately 950° F. and circulated about the tubes at such a rate that their temperature leaving this zone is approximately 1075° F. The spent reactivating gases and combustion products formed by burning of the carbonaceous material from the catalyst are discharged from the tubes 2' of reactor B through header 4', line 8', line 16', valve 17' and line 18.

During the above described portion of the operating cycle (while catalytic cracking is taking place in reactor A and reactivation of the catalyst is taking place in reactor B) combustion gases discharged from reactor A at a temperature of approximately 1225° F. are supplied through duct 20, switching zone 22 and duct 27 to cooling zone 37, wherein their temperature is reduced to approximately 1075° F., and wherefrom they are directed through the continuation of duct 27 and, in part, through duct 33 to air preheater 40, while the remaining portion of this gas stream is directed through switching zone 24 and duct 28 to blower 30 and thence through the continuation of duct 28 to heating zone 34, wherein they are commingled with a sufficient quantity of hotter combustion gases generated in this zone to increase the temperature of the mixture to approximately 1550° F. at which temperature the mixture is supplied to reactor A. Simultaneously, combustion gases discharged from reactor B at a temperature of approximately 1075° F. are directed through a duct 21, switching zone 22, duct 26, switching zone 24 and duct 29 to blower 31 wherefrom they are supplied to cooling zone 33, wherein their temperature is reduced to approximately 950° F., and the resulting cooled gases are thence supplied at approximately 950° F. to reactor B to complete the cycle. During this portion of the operation, burner 36 and cooling zone 33 are in operation while the operation of burner 36' and cooling zone 32 is discontinued. The switching dampers or stream-directing members 23, 25 and 48 are in the position shown by the solid lines in the drawing and preheated air is directed from zone 40 through line 46 to heating zone 34.

When it becomes necessary to discontinue catalytic cracking in reactor A and reactivate the catalyst in this zone, while the catalytic cracking operation continues in reactor B, the heated hydrocarbon vapors flow from line 5 through line 6', valve 7' and header 3' to and through the tubular elements 2' of reactor B, wherefrom the resulting conversion products are directed through header 4', line 8', valve 9' and line 10 to the separating and recovery equipment and the oxygen-containing reactivating gases from line 11 are directed through line 14, valve 15 and header 3 to and through the tubular elements 2 of reactor A wherefrom the resulting spent reactivating gases and combustion products are discharged through header 4, line 8, line 16, valve 17 and line 18. During this portion of the operating cycle the dampers or stream-directing members 23, 25 and 48 are in the positions indicated by the dotted lines in the drawing, heating zone 35 and cooling zone 32 are in operation and the operation of heating zone 34 and cooling zone 33 is discontinued. Thus, the combustion gases in the cycle serving reactor A flow therefrom through duct 20, switching zone 22, duct 26, switching zone 24 and duct 28 back to reactor A and are cooled in zone 32 to a temperature of approximately 950° F. while the combustion gases in the cycle serving reactor B flow therefrom through duct 21, switching zone 22, duct 27, switching zone 24 and duct 29 back to reactor B, being cooled in zone 37 to a temperature of approximately 1075° F. and reheated in zone 35 to a temperature of approximately 1550° F. During this portion of the operation, preheated air from zone 40 is directed through duct 47 to heating zone 35.

I claim as my invention:

1. In an apparatus embodying separate heat exchanger type reactors each having an inlet conduit for supplying a separate stream of heat exchange fluid to each reactor, heat exchange fluid propulsion means in each of said inlet conduits, means associated with each of said inlet conduits for selectively supplying heat to either of said streams on the discharge side of said propulsion means and exterior to the reactors, means associated with each of said inlet conduits for selectively cooling either of said streams on the discharge side of said propulsion means and exterior to the reactors, a switching zone common to said inlet conduits disposed on the suction side of said propulsion means, discharge conduits for the heat exchange fluid leading from each of the reactors to another switching zone, a first conduit directly connecting said switching zones, a second conduit connecting said switching zones and having means disposed therein for cooling the stream of heat exchange fluid passing therethrough, and stream-directing means in each of said switching zones, said stream-directing means being adjustable to selectively direct the stream of heat exchange fluid discharged from either of the reactors through said first connecting conduit to the suction side of the propulsion means in the inlet conduit communicating with the same reactor and to direct the stream of heat exchange fluid discharged through the outlet conduit of the other reactor through said second connecting conduit and the cooling means disposed therein to the suction side of the propulsion means in the inlet conduit communicating with the last mentioned reactor.

2. In an apparatus embodying two separate heat exchanger type reactors each reactor being adapted to contain a mass of granular contact material and each being adapted for the flow of a stream of heat exchange fluid therethrough in indirect heat exchange relation with said contact material and the apparatus including means for passing a stream of reactants to be converted selectively through either of said reactors in direct contact with said contact mass disposed therein while simultaneously passing a separate stream of other reactants through the other reactor in direct contact with the contact mass disposed therein, a discharge conduit for a stream of heat exchange fluid leading from each of said reactors to a switching zone, an inlet conduit for a stream of said heat exchange fluid leading from another switching zone to each of said reactors, propulsion means for the heat exchange fluid in each of said inlet conduits, means associated with each of said inlet conduits on the discharge side of said propulsion means therein for selectively cooling the stream of heat exchange fluid being supplied to either of the reactors, means associated with each of said inlet conduits on the discharge side of said propulsion means therein for selectively heating the stream of heat exchange fluid being supplied to either of the reactors, a first conduit directly connecting said switching zones, a second conduit connecting said switching zones and having cooling means disposed therein for the stream of heat exchange fluid passing therethrough, and stream-directing means in each of said switching zones, said stream-directing means being adjustable to selectively direct the stream of heat exchange fluid discharged from either of said reactors through said first connecting conduit to the suction side of the propulsion means in the inlet conduit communicating with the same reactor and to direct the stream of heat exchange fluid discharged from the other reactor through said second connecting conduit and the cooling means disposed therein to the suction side of the propulsion means in the inlet conduit communicating with the last mentioned reactor.

MAYNARD P. VENEMA.